Dec. 27, 1960 J. S. ATOLS 2,966,080
COMBINED GAUGE AND JIG
Filed Sept. 4, 1959 4 Sheets-Sheet 1

INVENTOR.
JOHN S ATOLS
BY Wolfe, Hubbard,
Voit & Osann
ATTYS.

INVENTOR.
JOHN S ATOLS
BY Wolfe, Hubbard,
Voit & Osann
ATTYS.

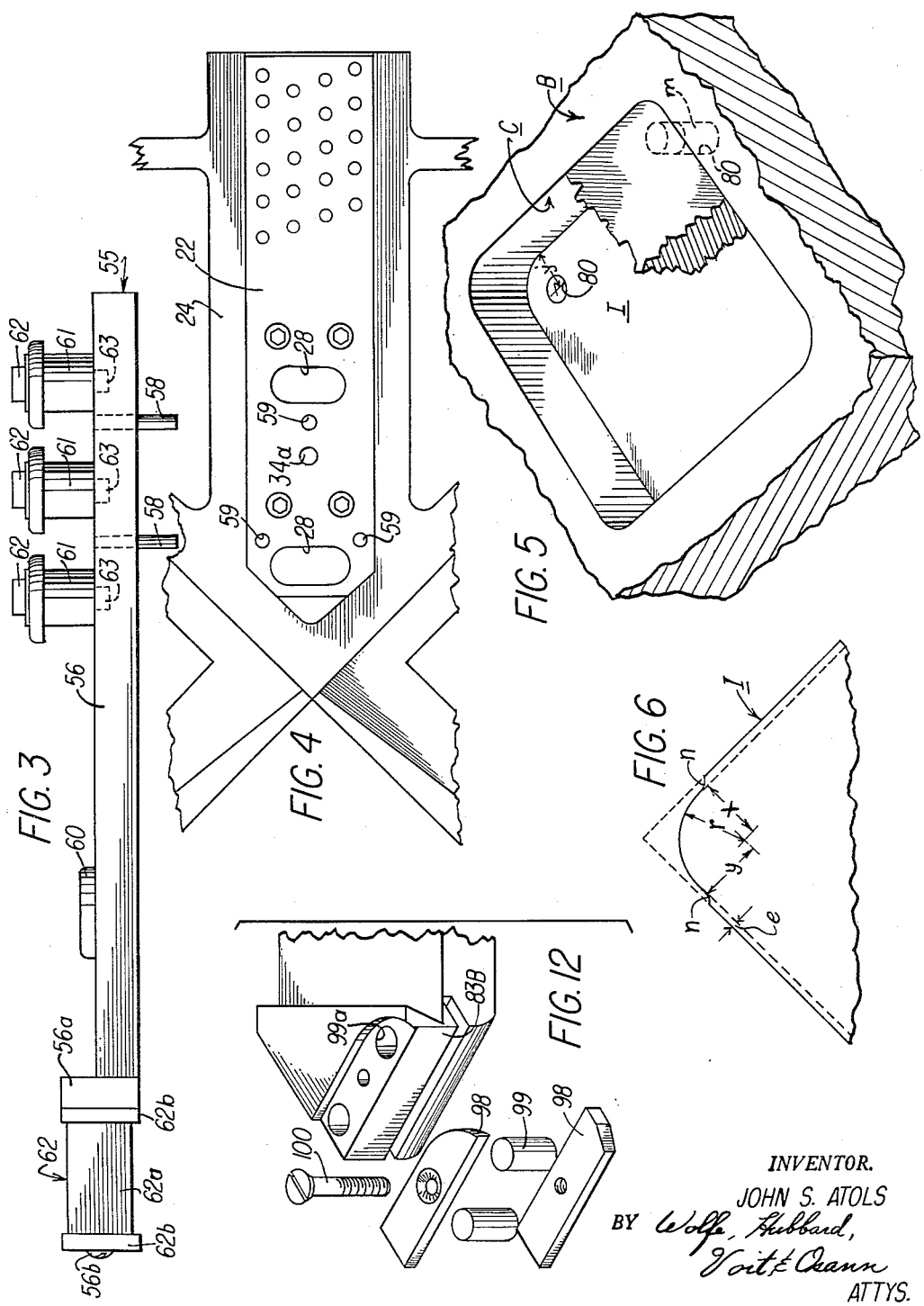

Dec. 27, 1960     J. S. ATOLS     2,966,080
COMBINED GAUGE AND JIG
Filed Sept. 4, 1959     4 Sheets-Sheet 4

INVENTOR.
JOHN S. ATOLS
Wolfe, Hubbard,
Voit & Osann
ATTYS.

United States Patent Office 2,966,080
Patented Dec. 27, 1960

2,966,080

COMBINED GAUGE AND JIG

John S. Atols, 5009 W. Armitage, Chicago 38, Ill.

Filed Sept. 4, 1959, Ser. No. 838,243

5 Claims. (Cl. 77—62)

The present invention relates generally to gauges and jigs and more particularly to such devices which find particular though by no means exclusive utility in the fabrication of molding and forming dies.

In the manufacture of dies, such for example as those for use in the molding of plastics, it is conventional practice to fashion the main body of the die as by initially casting the same and then subsequently finish machining it to define the mold cavity. Oftentimes exceedingly narrow, channel-like, cavities or cavity portions are required, for example narrow cavity channels are utilized for forming relatively thin portions such as flanges on the finished article. Similarly portions of peculiar contour are frequently desired in the finished article. In such instances direct machining of the die body to define narrow channels and unusual contours is exceedingly difficult if not substantially impossible.

Additionally, it is often desirable to provide a basic die body and to make provision for modification of the form of the cavity so as to permit the same body to be utilized in forming various articles. Thus it is common practice to utilize inserts which are fashioned separated from the die body and are subsequently inserted within the die body to define therewith cavities of the desired form. This practice, however, requires not only exceedingly accurate machining of both the die body and the insert so that they are exactly complemental, but in addition there is entailed the necessity for precise positioning of the insert with respect to the die body. With gauges heretofore available the accomplishment of these ends is at best a time consuming and expensive operation and accuracy is primarily dependent upon individual skills.

Accordingly, it is a general object of the present invention to provide a combined gauge and jig which is intended primarily to facilitate the fabrication of molding and forming dies of the foregoing general character and which minimizes the necessity for reliance upon operator skill to achieve the required accuracy of complementally formed and finish-machined parts.

A more specific object lies in the provision of a combined gauge and jig for use in making workpiece setups for machining operations thereon and which device also effectively functions as a jig for the performance of certain of such machining operations.

A related object is to include in a gauge and jig of the foregoing character provision for multiple orthogonal adjustments so as to enhance its utility.

Yet another object is to incorporate the features of the combined gauge and jig so as to permit utilization of the invention in workpiece setups for both internal and external machining operations.

The objects of the invention thus generally set forth together with other objects and ancillary advantages are attained by the constructions and arrangements shown by way of illustration in the accompanying drawings, in which:

Fig. 3 is a side view of the jig member of the device shown in the preceding figures.

Fig. 4 is a fragmentary bottom plan view of the guide and slide members of the device shown in the preceding figures.

Fig. 5 is a fragmentary perspective view of a forming die and insert.

Fig. 6 is a fragmentary plan view of a partially machined insert.

Figure 1:
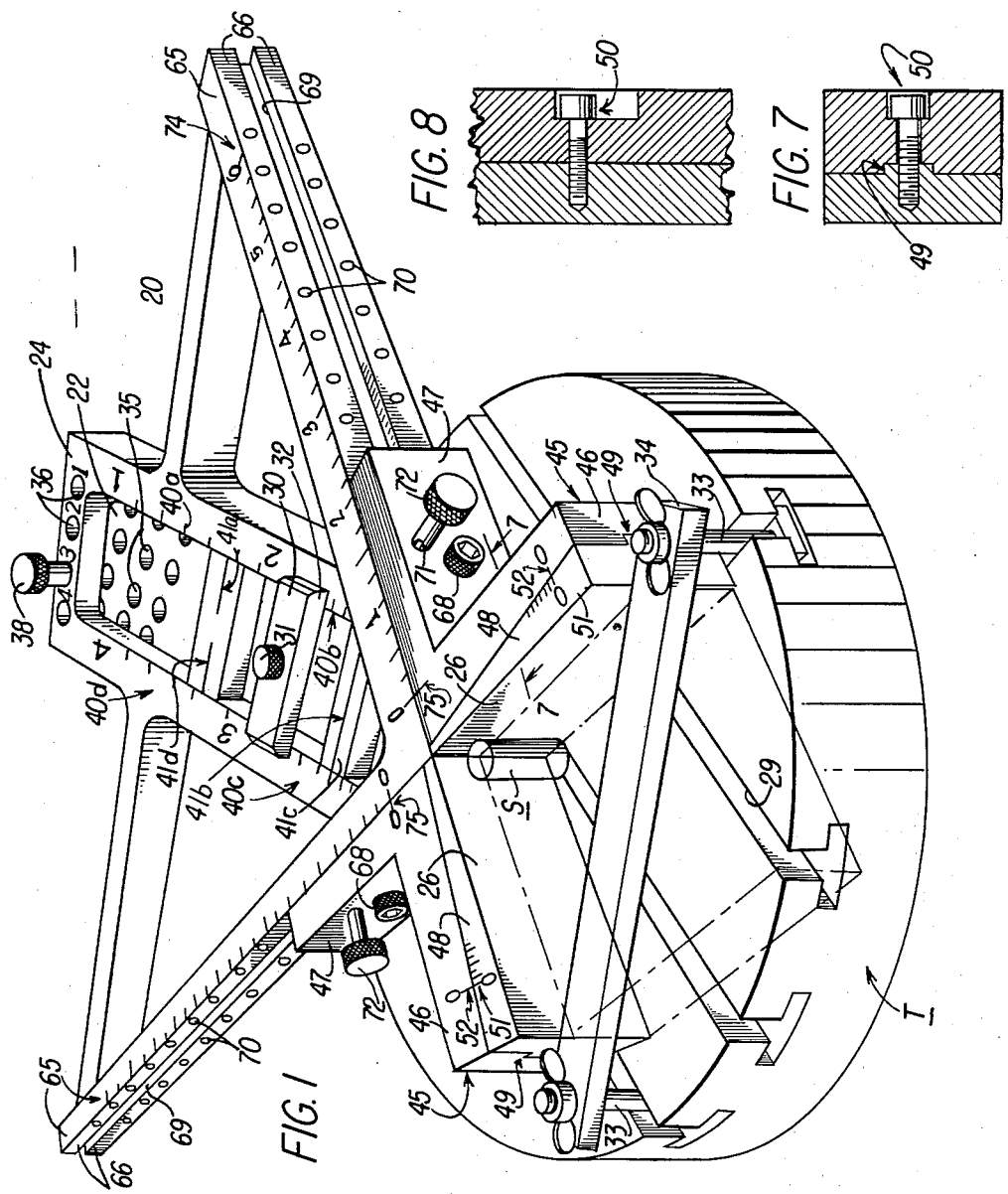
Figure 1 is a perspective view of a preferred form of combined gauge and jig embodying the features of the present invention the same being shown in use for effecting a workpiece setup.

Figs. 7 and 8 are sectional views for illustrating relative adjustment between portions of the work abutment legs of the device shown in Fig. 1. Fig. 7 comprises a vertical section taken substantially in the plane of line 7—7 in Fig. 1. Fig. 8 comprises a fragmentary horizontal section through the same parts.

Figure 9:
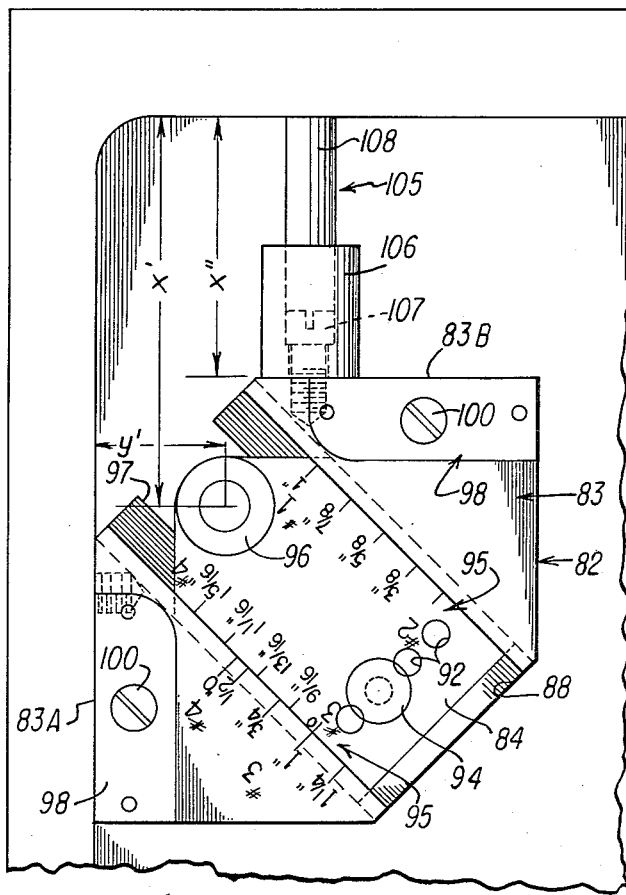

Fig. 9 is a top plan view of a modified form of combined gauge and jig which form is primarily intended for use within a die cavity, the same being fragmentarily indicated.

Figure 10:
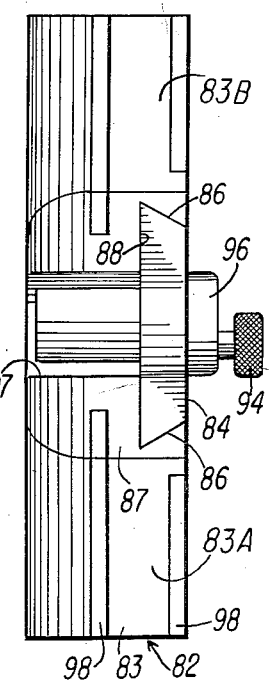

Fig. 10 is an end elevation of the combined gauge and jig shown in Fig. 9.

Figure 11:
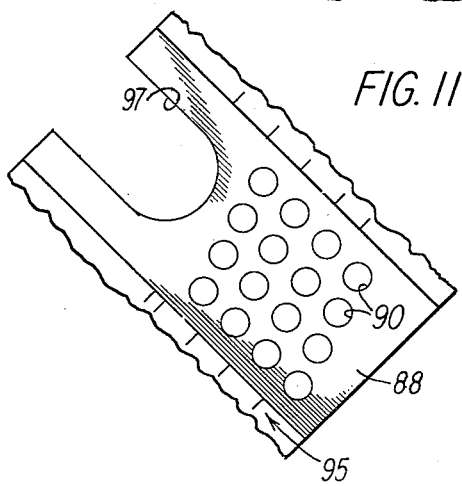

Fig. 11 is a fragmentary plan view of the guide member of the combined gauge and jig shown in Figs. 9 and 10.

Fig. 12 is an exploded perspective view of a work abutment portion of the combined gauge and jig shown in Figs. 9 and 10.

While the invention is susceptible of various modifications and alternative constructions, there are shown in the drawings and will herein be described in detail certain preferred embodiments. It is to be understood, however, that it is not thereby intended to limit the invention to the specific forms disclosed. On the contrary, it is intended to cover all modifications and alternative constructions falling within the spirit and scope of the invention as expressed in the appended claims.

As has hereinbefore been indicated, molding and forming dies are conventionally fabricated by the fashioning of a main die body with what might be termed a major cavity, which cavity is modified to achieve the ultimately desired contour by installing therein preformed inserts. It will be helpful to the understanding of the present invention to outline briefly the operations which must be performed in the fabrication of such a molding or forming die. The main die body, generally indicated at B in the drawings, is usually formed of steel by casting or forging and subsequently machining the same as by a milling operation to define a cavity C. Inserts are utilized to modify this cavity so as to attain a desired finished product contour. For purposes of illustration herein a generally rectangular insert I is shown, and this insert is to be fashioned for precise interfitting engagement and fastening in one corner of the cavity C (Fig. 5).

It will be assumed for illustrative purposes that the cavity C in the die body B is of generally rectangular form having adjacent vertical side walls joined at a rounded corner and terminating by right angular intersection with the bottom of the cavity and the outer surface of the die body. Thus to fashion a complemental insert an appropriately sized workpiece is chosen. Conventionally the insert is preformed to proper thickness as, for example, to a thickness to correspond to the depth of the cavity C as shown in the drawings. It will be understood that any thickness can be selected as desired. This workpiece then must have its corner rounded to the same radius as that of the cavity and the rounded portion must terminate precisely tangentially with the edge faces so that the cavity corner is precisely fit by the insert. As will be apparent to one skilled in the art, the rounding of the corner can be accomplished by milling. This operation contemplates that the workpiece will be affixed to a rotary work table whereby it can be moved with respect to an appropriate cutter as in a vertical milling machine. Such a rotary work table is indicated generally at T in the drawings. These tables conventionally have provision for the reception of a centering stud S.

The first step in effecting the setup of the workpiece which is to become the insert I is to place the centering stud in the work table and then to adjust a gauging device with respect thereto so that the workpiece can be subsequently clamped to the table. After the workpiece is clamped to the table the milling of the corner is effected by rotation of the table with respect to the milling cutter.

Subsequent to the milling operation, the faces of the workpiece must be finish-machined as by grinding so that the side faces intersect the rounded corner tangentially. Thereafter provision must be made for fastening the insert into which the workpiece has been converted in place of the mold cavity. This can be accomplished through the utilization of machine screws or the like which usually are inserted through the die body and cavity floor and engage a previously threaded opening or recess in the back side of the insert. It will be appreciated that for exact mating engagement between the insert side and corner faces and the juxtaposed faces of the die cavity the die body opening and the insert recess must be similarly precisely located. Additionally it will be recalled that in the molding of various plastics, passages for the conduction of a heating medium, such as steam, are formed in the die body and in the insert. Desirably the fit between the insert and the die body is so precise that not only are contiguous portions of such passages alined but necessity for sealing gaskets and the like is avoided.

In accordance with the present invention a combined gauge and jig is provided which facilitates workpiece setup for effecting the machining operations indicated above, substantially eliminating the time-consuming try-and-try-again steps heretofore required by conventional height gauges and similar devices. Thus, the present invention contemplates direct utilization with conventional work tables not only effecting workpiece positioning thereon, but also eliminating cumulative error to the end that necessary reliance upon operator skill is minimized.

Referring more particularly to the drawings in Fig. 1 there is shown a combined gauge and jig, generally indicated at 20, embodying the features of the present invention, for use in cooperation with the work table T to effect the setup of a workpiece (indicated in phantom outline) which is to become the insert I. The combined gauge and jig 20 includes a guide 22 adapted to be fixed to the table T. It also includes a slide 24 which is relatively positionable with respect to the guide 22. The slide 24 carries a work abutment having work engaging surfaces 26 disposed at right angles to each other to define a work-engaging V.

The work table T is intended to mount the workpiece with respect to a tool for machining operation thereon. In the foregoing discussion of the fashioning of the insert I it was contemplated that a corner of the workpiece would be milled to a predetermined radius so as to precisely fit the complementally formed corner of the cavity C of the die body B. Thus the work table T might be of the type by means of which the workpiece would be rotated with respect to a milling cutter. The first step to be accomplished, therefore, is to fix the combined gauge and jig to the work table. For this purpose the guide 22 is provided with means for securing it to the table. This means, it is contemplated, will incorporate ordinary T-bolts which are received in apertures 28 formed in the guide 22 (Fig. 4). The T-bolts cooperate with the transverse T-slots 29 that are conventionally provided in such work table surfaces. With the slide 24 in place upon the guide 22 and adjusted according to the diameter of the centering stud S in the table, the position of the guide with respect to the table is determined and the guide is clamped in place. The stud is then removed from the work table, and the slide 24 is adjusted longitudinally of the guide so that the center for the operation of the milling cutter upon the workpiece is determined. The slide is then secured in place with respect to the guide and for this purpose a clamp 30 is provided. The clamp includes a thumb screw 31, which is threaded into an appropriately formed hole 31a in the guide 22, and a cross bar 32 whose ends are adapted to engage the slide 22.

With the combined gauge and jig thus adjusted and affixed to the work table T, the workpiece is then moved into position into the V of the work abutment so that its side faces engage the work abutment surfaces 26. The workpiece is then clamped to the work table in any suitable manner as by the use of a T-bolt and cross bar clamping arrangement 33, 34. The workpieces is thus positioned securely for the contemplated milling operation.

To facilitate the relative adjustment of position of the side 24 with respect to the guide 22 cooperating stop means are provided. For this purpose a plurality of incrementally spaced stops are utilized, the spacing being according to any desired arrangement as, for example fractions of an inch in $\frac{1}{16}$ inch increments. As shown, the stop means employed in the illustrative embodiments includes a plurality of precisely arranged apertures 35 in the guide 22 which are adapted to have brought into alinement therewith a corresponding aperture 36 in the slide 24 and when alined are adapted to receive a stop pin 38 so as to maintain such alinement and thus maintain the selected position of adjustment of the slide with respect to the guide.

It will be apparent to one skilled in the art that the apertures 35 are desirably made fairly large as for example on the order of $\frac{3}{16}$ inch in diameter. Thus, in order ot obtain incremental positions of adjustment of a distance less than $\frac{3}{16}$ inch, e.g. $\frac{1}{16}$ inch as noted above, the individual apertures 35 are appropriately spaced apart and are arranged in laterally-spaced longitudinal rows with the apertures in adjacent rows offset to provide the desired $\frac{1}{16}$ inch increments. In this manner precise spacing to provide the desired small incremental position adjustments can be readily achieved. In the illustrative device the apertures 35 are arranged in four laterally spaced longitudinal rows. To correspond therewith four laterally spaced apertures 36 are provided in the slide 24. The spacing of the apertures 36 corresponds to the lateral spacing of the rows of apertures 35 in the guide 22.

To facilitate rapid relative adjustment of the slide with respect to the guide, scales are provided on the slide for cooperation with indexes rigid with the guide. Since four rows of apertures 35 are provided, correspondingly four scales and indexes are provided in the illustrative device. These slide scales are indicated at 40a, 40b, 40c and 40d for cooperation with guide indexes 41a, 41b, 41c and 41d respectively. To correspond to the rows of apertures, which in Figure 1 are numbered from right to left as rows 1, 2, 3 and 4, adjacent the slide apertures 36 corresponding numbers 1, 2, 3 and 4 are provided on the upper face of the slide adjacent the respective scales.

It has been found expedient to provide $\frac{1}{4}$ inch increments of adjustment in each row of apertures 35, and thus the apertures 35 are located on centers spaced apart $\frac{1}{4} \times \sqrt{2}$ inch. However, scale 1, for example, would include incremental position indications for $\frac{1}{4}$ inch, $\frac{1}{2}$ inch, $\frac{3}{4}$ inch, 1 inch, $1\frac{1}{4}$ inch and $1\frac{1}{2}$ inch, without necessity for the $\sqrt{2}$ indication. Scale 2 indicates a similar aperture spacing but begins $\frac{1}{16}$ inch offset. Thus scale 2 would include incremental position indications for adjustments of 5/16 inch, 9/16 inch, 13/16 inch, 1 1/16 inch and 1 5/16 inch. Similarly scale 3 indicates incremental positions for 3/8 inch, 5/8 inch, 7/8 inch, 1 1/8 inch and 1 3/8 inch, and scale 4 for 7/16 inch, 11/16 inch, 15/16 inch, 1 3/16 inch and 1 7/16 inch, such positions being representative of the various radii that might be employed in rounding the corner of the workpiece as indicated at $r$ in Fig. 6, and thus are indicative of the location of the apex of the V between the work engaging surfaces 26 of the work abutment that is carried by the slide 24.

Perhaps it would be more accurate and more easily understood in speaking of "location of the apex of the V" to define this in terms of the location of the center of the arc of radius $r$ according to the perpendicular distance of that center from the work engaging surfaces 26. This gives two orthogonal dimensions as indicated at $x$ and $y$ respectively in Fig. 6. These dimensions, $x$ and $y$ are equal when the planes of the surfaces 26 intersect on the center line of the guide and slide as shown in Fig. 1. As a result the actual spacing of the guide apertures 35 and the incremental spacing of the indicia comprising the scales 40a–40d, inclusive (scales 1, 2, 3 and 4), correspond to the square root of the quantity $x^2+y^2$ or simply $\sqrt{2x^2}$.

It will be apparent to one skilled in the art that in the art that in order to effect an external machining operation such as the contemplated milling of the corner to the radius $r$ of the workpiece to form the insert I the milling cutter must be urged firmly into engagement with the work. Thus the tool must bite initially into the work, and it is exceedingly difficult, if not substantially impossible, to obtain in this manner precise tangency at the point where the rounded corner surface is to merge with the side surfaces of the work. Ordinarily a notch as indicated at $n$ in Fig. 6 of several thousandths of an inch depth is experienced. To compensate for this, the illustrative device contemplates fashioning the work abutment so that the work engaging surfaces 26 can be moved parallel to themselves without altering their relative angular positions with respect to the center line of the device. More particularly in the illustrative device the work engaging surfaces 26 are disposed at an angle of 45° (or 135°, if measured in the opposite direction) with respect to the center line of the slide and guide. Thus they are located at 90° with respect to each other. In the illustrative device the work abutment comprises a pair of legs 45 having a shank portion 46 and a foot portion 47 disposed at right angles to each other. The work engaging surfaces 26 are formed by face pieces 48 which are carried by the shanks 46. To provide compensation for the so-called cutter bite the face pieces 48 and the shank portions 46 of the legs 45 are fashioned with complementally formed inclined abutting surfaces.

Thus, relative longitudinal movement of the face pieces 48 upon these shank surfaces 46 effects parallel movement of the work engaging surfaces 26. Desirably a tongue and groove joint is provided between the face pieces 48 and shanks 46 as indicated at 49 so as to prevent any transverse movement, and clamping means 50 in the form of a screw-in-slot are provided between the face pieces 48 and the shanks 46 (Figs. 7 and 8). To precisely indicate the amount of compensation a scale 51 is provided on each of the face pieces for cooperation with an index 52 on each shank, the incremental spacing indicated by the scale being determined according to the slope of inclination between the juxtaposed surfaces of the face pieces 48 and shank 46. Ordinarily provision for compensation from zero to .030 inch has been found to be sufficient and such compensation is indicated at $e$ in Fig. 6. The amount of metal indicated at $e$, after the milling operation has been completed can be readily removed as by grinding in finishing the workpiece to form the insert I.

Figure 2:
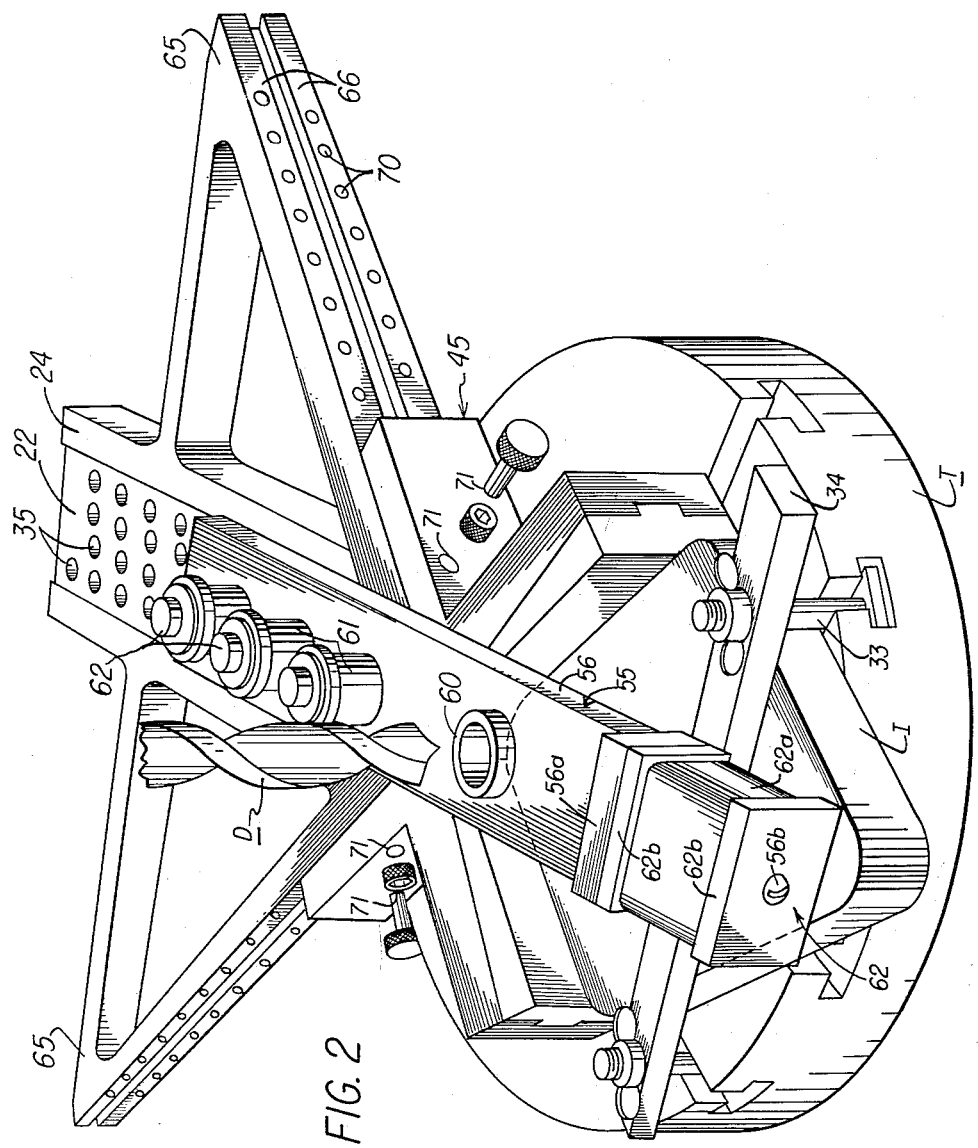
Fig. 2 is a perspective view of the combined gauge and jig shown in Fig. 1 but conditioned for a drill jig operation.

As noted above, the insert I must be fastened into place within the cavity C in the die body B and this is conventionally accomplished through the use of an appropriate machine screw, as indicated at $m$ in Fig. 5, which is inserted through the floor of the cavity C into an appropriately threaded recess formed in the back side of the insert I. This recess must be precisely located, and to do so the instant device is employed as a drill jig. Accordingly, relative longitudinal adjustment of the slide and guide is effected, and the two are clamped in such relative position of adjustment by appropriate tightening of the clamp 30. To serve to guide the cutting tool, such as a drill D, the instant device incorporates a jig member generally indicated at 55. As shown, the jig member includes a tool guide support which in the illustrative embodiment is in the form of a bar 56. The bar 56 is adapted to be mounted upon the guide 22, and for this purpose it is provided with three positioning pins 58 which are received in precisely located apertures 59 formed in the underside of the guide 22. The support bar 56 mounts a tool guide 60 adjacent the forward end thereof. In the illustrative device the tool guide is in the form of a drill bushing and is located in the bar with respect to the positioning pins 58 and guide apertures 59 so that the center of the recess which is to be formed in the insert I is precisely located with respect to the work engaging surfaces 26 of the work abutment of the device, and thus with respect to the side faces of the insert I, according to the relative position of adjustment of the slide and guide as initially selected, and as indicated by the respective ones of the scales and indexes 40a–40d, 41a–41d. With the insert in engagement with the surfaces 26 and positioned as indicated in Fig. 2, the formation of the desired recess as by a drill D can be effected.

If desired during the drilling operation the insert I can be clamped to the work table utilizing similar fastening means 33, 34 as before. Such an arrangement is shown for purposes of illustration in Fig. 2.

Ordinarily inserts are formed of steel and are thus ferromagnetic. Thus, as a convenience to the use of the instant device, the jig member 55 can be equipped with a permanent magnet to hold such a workpiece in place. Such a magnet is indicated at 62 and includes a permanently magnetized body 62a, such, for example as one formed of Alnico, and pole pieces 62b of ordinary alloy steel. In the illustrative device the magnet 62 is mounted upon an end piece 56a, which is rigid with the end of the support bar 56, as by a screw 56b.

Obviously, recesses of different diameters to accommodate various sizes of mounting screws will be desired from time to time. To enhance the utility of the device provision is made to have differently sized drill bushings readily at hand. For this purpose the illustrative device contemplates provision for mounting additional drill bushings 61 upon the support bar 56 of the jig member 55. The mounting of the additional drill bushings 61 is readily accomplished through the utilization of appropriate cap screws 62 which extend through the bushings 61 and engage appropriately threaded recesses 63 formed adjacent the inner end of the support bar 56. Experience has demonstrated that mounting screws of 3/8 inch, 1/2 inch, 5/8 inch and 3/4 inch sizes are those most frequently employed for fastening inserts. Thus, the permanently installed drill bushing 60 can be for the largest of these sizes, e.g., to guide a 3/4 inch tap drill. The bushing 60 then will provide a bore diameter of 21/32 inch. The additional drill bushings provide for 17/32 inch, 27/64 inch, and 5/16 inch bore diameters for tap drills. Each of these bushings are available with an external diameter of 21/32 inch. Thus, the appropriate one of the additional drill bushings is selected and is simply inserted into place within the drill bushing 60, no further clamping being required.

As hereinbefore described the instant device has been arranged for providing a rounded corner on the insert I and for locating a screw-receiving recess therein at a point equidistant from the contiguous side faces of the insert. Oftentimes it will be desirable to locate the recess at a point where the distances from the contiguous side surfaces of the insert are unequal. For this purpose the legs 45 are mounted for respective movement toward and away and from the apex of the V as indicated in Fig. 1. Thus, the slide is provided with arms 65 which are rigid with the slide 24 and extend rearwardly from the apex of the V at angles of 45° on opposite sides of the center line of the slide 24. The legs 45 are mounted for relative movement along the arms 65. Thus, the arms 65 define ways 66 upon which the foot portions 47 of the legs 45 are mounted and means such as T-bolts 68 and complemental T-slots 69 are provided for mounting the foot portions 47 of the legs 45 upon the arms 65. Additionally the foot portions 47 and arms 65 incorporate stop means respectively defining both a forward limit position for each leg and remote incrementally spaced and alternatively selectable relative positions of adjustment for each leg 45 with respect to each of the arms 65. The forward position is that, as shown in Fig. 1, wherein the planes of the work engaging surfaces 26 intersect upon the center line of the slide 24 and guide 22. This position for each leg is defined by alinement of the initial one of a series of apertures 70 formed in the ways 66 with an aperture 71 formed in the foot portion 47 of the leg 45. Desirably the apertures 70 are arranged in two spaced rows and accordingly a pair of appropriately located apertures 71 are provided in the foot portion 47. For cooperation therewith when respective ones of the apertures 71 are alined with the apertures 70, a stop pin 72 is provided for each of the legs 45. To facilitate the selection of the positions of adjustment of the legs 45 with respect to the arms 65, each of the latter has provided thereon an appropriate scale 74 for cooperation with an index 75 on each of the legs 45.

The present invention also contemplates incorporation in a form for utilization within the cavity C of the die body B as, for example to precisely locate an aperture 80 in the die body B for the accommodation of the mounting screw m. Thus, in Figs. 9-12 of the drawings there is illustrated a modified form of the instant invention for locating precisely such an aperture and for guiding a tool for forming the same.

Referring more particularly to Fig. 9 of the drawings, the modified form of combined gauge and jig is generally indicated at 82. It includes a guide 83 and a slide 84. The slide 84 is mounted upon the guide for longitudinal movement with respect thereto. For this purpose the slide is fashioned as an elongated bar having chamfered side faces 86 and a flat bottom face 87 for interfitting sliding engagement in a complementally formed, dovetail channel 88 in the guide 83.

In this form of the invention the guide 83 provides the work abutment. To this end the side surfaces 83A and 83B are utilized as the work engaging surfaces, as for example to engage the vertical side walls of the cavity C.

Cooperating stop means defining incrementally spaced and alternatively selectable relative positions of adjustment of the slide and guide is also incorporated in this form of the invention. As in the form previously described, this stop means includes a plurality of longitudinally incrementally spaced apertures 90 arranged in laterally spaced rows and the slide has formed therein a row of correspondingly laterally spaced apertures 92. When respective ones of the apertures 92 are alined with respective ones of the apertures 90 the relative position of adjustment of the slide 84 with respect to the guide 83 is maintained by the utilization of a stop pin 94 which is alternatively insertable in the alined apertures.

To facilitate selection of the relative positions of adjustment of the slide 84 with respect to the guide 83, scales of indicia are provided on the contiguous top portions of the slide and guide. These scales are generally indicated at 95 and the indicia are correlated to the incremental spacing of the apertures 90 so as to indicate the location of the center of the aperture 80 which is to be made in the floor of the cavity C of the die body B, for example, a distance $y'$ as indicated in Figs. 5 and 9.

As hereinbefore noted it is conventional practice to complete the machining of the cavity C and then fit the insert I thereto. With this in mind it will be apparent that this embodiment of the invention permits of substantial simplification and thus it is contemplated that the slide 84 directly mount a tool guide. In the illustrative embodiment of this form of the invention, a tool guide in the form of a drill bushing 96 is mounted directly at the forward end of the slide 84. To accommodate the projecting portion of the drill bushing 96 and to permit unimpeded longitudinal movement of the slide 84 with respect to the guide 83, the guide has formed therein a deep clearance notch 97.

Magnetic holding means are provided to facilitate maintenance of position of this form of the combined gauge and jig in the die cavity. As shown the magnetic holding means are incorporated in the work engaging surfaces 83A and 83B of the guide 83. As shown in detail in Fig. 12, these magnets include pole pieces 98 which are inset into the body of the guide 83 so that their outer edges are coplanar with the work engaging surfaces 83A or 83B, and permanent magnets 99 are inserted in the non-ferrous body of the guide 83 as in apertures 99a, the same being held in place by the use of an appropriate fastener such as a screw 100.

It is also contemplated, as in the form of the invention previously described, that it might be desired to locate the aperture 80 at a position of unequal distances from the side walls of the cavity C. For this purpose provision is made for extending the position of abutment of the work engaging surfaces 83A and 83B. As shown this can be accomplished by the utilization of extension blocks generally indicated at 105 in Fig. 9. Such extension blocks 105 would be precisely machined to length. As shown the blocks include a primary extension 106 of predetermined precise length and of generally cylindrical form counterbored to receive a mounting screw 107. The mounting screw 107 is received in a complementally threaded recess formed in the work engaging surface 83B. Additional extensions can be provided through the use of extension rods 108. These rods would also be precisely machined to length and fashioned for insertion in the outer end of the bore of the extension block 107.

Fig. 9 thus indicates the utilization of this embodiment of the invention for the location of an aperture, such as the aperture 80 of Fig. 5, at a distance $y'$ from one side wall of the cavity C, and a distance $x'$ from the contiguous cavity wall, the distance $x'$ being equal to the distance $y'$ plus a distance $x''$, the latter being determined by the combined lengths of the extensions 107 and 108.

It will be apparent from the foregoing, therefore, that according to the teachings of the present invention there is provided a combined gauge and jig which effectively facilitates the fabrication of molding and forming dies, which minimizes the necessity for reliance upon operator skill to achieve the requisite accuracy of complementally formed and machined parts for precise interfitting engagement. It permits of incorporation in forms for both internal and external machining operations and the provision for multiple orthogonal adjustment results in substantially universal utility. While the invention has been illustrated and described in connection with its utility in the fabrication of molding and forming dies, it will be readily apparent to those skilled in the art that its utility is by no means limited to this particular field.

I claim as my invention:

1. A combined gauge and jig for locating a workpiece relative to a tool comprising, in combination, a guide, means for securing said guide with respect to the tool, a slide mounted for movement longitudinally with respect to said guide, cooperating stop means on said guide and slide defining incrementally spaced and alternatively selectable relative positions of adjustment and a work abutment carried by said slide for positioning the workpiece, said work abutment including a pair of legs each having a shank portion and a foot portion disposed at right angles to each other, said shank portions each providing a surface for engagement with the work, said work surfaces being disposed at 90° to each other and at 135° on opposite sides of the longitudinal center line of said slide, a pair of arms each defining ways disposed at 45° on opposite sides of the longitudinal center line of said slide, means respectively mounting said legs upon said arms with said foot portions thereof respectively engaging said ways for movement therealong, and cooperating stop means on said arms and legs respectively defining incrementally spaced and alternatively selectable relative positions of adjustment of said arms and legs while maintaining the aforesaid angular relation of said work engaging surfaces.

2. A combined gauge and jig for locating a workpiece relative to a tool comprising, in combination, a guide, means for securing said guide with respect to the tool, a slide mounted for movement longitudinally with respect to said guide, cooperating stop means on said guide and slide defining incrementally spaced and alternatively selectable relative positions of adjustment and a work abutment carried by said slide for positioning the workpiece, said work abutment including a pair of legs each having a shank portion and a foot portion disposed at right angles to each other, said shank portions each providing a surface for engagement with the work, said work surfaces being disposed at 90° to each other and at 135° on opposite sides of the longitudinal center line of said slide, a pair of arms each defining ways disposed at 45° on opposite sides of the longitudinal center line of said slide, means respectively mounting said legs upon said arms with said foot portions thereof respectively engaging said ways for movement therealong, and cooperating stop means on said arms and legs respectively defining a forward limit position for each leg and remote incrementally spaced and alternatively selectable relative positions of adjustment while maintaining the aforesaid angular relation of said work engaging surfaces, the apex of the angle included between said work engaging surfaces falling upon the center line of said slide when said legs are both in their forward limit positions.

3. A combined gauge and jig for locating a workpiece relative to a tool comprising, in combination, a guide, means for securing said guide with respect to the tool, a slide mounted for movement longitudinally with respect to said guide, cooperating stop means on said guide and slide defining incrementally spaced and alternatively selectable relative positions of adjustment and a work abutment carried by said slide for positioning the workpiece, said work abutment including a pair of legs each having a shank portion and a foot portion disposed at right angles to each other, said shank portions each providing a surface for engagement with the work, said work surfaces being disposed at 90° to each other and at 135° on opposite sides of the longitudinal center line of said slide, a pair of arms fixed to said slide each defining ways disposed at 45° on opposite sides of the longitudinal center line of said slide, means respectively mounting said legs upon said arms with said foot portions thereof respectively engaged with said ways for movement therealong, and cooperating stop means on said arms and legs respectively defining a forward limit position for each leg and remote incrementally spaced and alternatively selectable relative positions of adjustment, the work engaging surface of one leg when in its forward limit position being coplanar with the way for the other leg.

4. A combined gauge and jig for locating a workpiece with respect to a tool comprising, in combination, a guide, means for securing said guide with respect to the tool, a slide relatively movable with respect to said guide, cooperating stop means carried by said slide and guide for securing said slide in alternatively selectable relative positions of adjustment, and a work abutment carried by said slide and adapted for engagement with the workpiece for positioning the same with respect to the tool according to the selected relative position of adjustment of said slide and guide, said stop means including a plurality of apertures in said guide arranged in laterally spaced rows with corresponding apertures in adjacent rows being incrementally spaced longitudinally and including a row of apertures in said slide laterally spaced to correspond to the spacing between the rows of apertures in said guide for selective alternative alinement with respective ones of said guide apertures and a pin alternatively insertable in said slide and guide apertures when alined for retaining said slide and guide in a selected relative position of adjustment and cooperating indicia on said slide and guide for indicating the selectable relation positions of adjustment.

5. A combined gauge and jig for locating a workpiece relative to a tool comprising, in combination, a guide, means for securing said guide with respect to the tool, a slide mounted for movement longitudinally with respect to said guide, cooperating stop means on said guide and slide defining incrementally spaced and alternatively selectable relative positions of adjustment and a work abutment carried by said slide for positioning the workpiece, said work abutment including a pair of legs carried by said slide, each having a face piece providing a surface for engagement with the work, said surfaces being disposed at 90° to each other and at 45° on opposite sides of the longitudinal center line of said slide, and means interposed between each leg and its respective face piece for effecting limited adjustment of the position of the work engaging surface thereof parallel to itself.

References Cited in the file of this patent

UNITED STATES PATENTS

| | | |
|---|---|---|
| 1,235,031 | Holmgren | July 31, 1917 |
| 2,367,582 | Honyoust | Jan. 16, 1945 |
| 2,435,256 | Whitmore | Feb. 3, 1948 |